(12) United States Patent
Boege et al.

(10) Patent No.: US 11,970,191 B2
(45) Date of Patent: Apr. 30, 2024

(54) TRACK-CONDITIONING UNIT WITH DEVICE FOR RAIL DRYING

(71) Applicant: SIEMENS MOBILITY GMBH, Munich (DE)

(72) Inventors: Ronny Boege, Olching (DE); Wilfried Stelzle, Kleinberghofen (DE)

(73) Assignee: Siemens Mobility GmbH, Munich (DE)

(*) Notice: Subject to any disclaimer, the term of this patent is extended or adjusted under 35 U.S.C. 154(b) by 805 days.

(21) Appl. No.: 17/056,092

(22) PCT Filed: Sep. 27, 2018

(86) PCT No.: PCT/EP2018/076348
§ 371 (c)(1),
(2) Date: Nov. 17, 2020

(87) PCT Pub. No.: WO2019/219224
PCT Pub. Date: Nov. 21, 2019

(65) Prior Publication Data
US 2021/0206399 A1 Jul. 8, 2021

(30) Foreign Application Priority Data
May 17, 2018 (DE) .......................... 102018207753.3

(51) Int. Cl.
*B61C 15/10* (2006.01)
*B60B 39/02* (2006.01)
(Continued)

(52) U.S. Cl.
CPC .......... *B61C 15/102* (2013.01); *B60B 39/021* (2013.01); *B60B 39/04* (2013.01);
(Continued)

(58) Field of Classification Search
CPC ... B60B 39/021; B60B 39/022; B60B 39/023; B60B 39/024; B60B 39/025;
(Continued)

(56) References Cited

U.S. PATENT DOCUMENTS 2,339,965 A * 1/1944 Turner .................. B61C 15/102
291/16
2,577,009 A * 12/1951 Frantz .................. B61C 15/102
285/125.1
(Continued)

FOREIGN PATENT DOCUMENTS

CN 10424567 A * 12/2014
DE 202017107399 U1 * 1/2018 ............... B05B 3/12
(Continued)

*Primary Examiner* — S. Joseph Morano
*Assistant Examiner* — James William Jones
(74) *Attorney, Agent, or Firm* — Laurence A. Gereenberg; Werner H. Stemer; Ralph E. Locher

(57) ABSTRACT

A combined track conditioning unit includes a dispensing apparatus with an outflow opening integrated in the front region of the dispensing apparatus which is suitable for applying a gaseous drying medium to a rail. A gritting material outlet unit which is integrated in the rear region of the dispensing apparatus and is suitable for applying a gritting agent to the rail also forms part of the dispensing apparatus. A rail vehicle is also provided. Additionally, a method for increasing a coefficient of friction between a rail and a wheel of a rail vehicle with the aid of a track conditioning unit is provided.

10 Claims, 2 Drawing Sheets

(51) Int. Cl.
  *B60B 39/04* (2006.01)
  *B60B 39/08* (2006.01)
  *B61C 15/08* (2006.01)
  *B61C 15/00* (2006.01)
(52) U.S. Cl.
  CPC ............ *B60B 39/08* (2013.01); *B61C 15/085* (2013.01); *B61C 15/10* (2013.01); *B61C 15/00* (2013.01)
(58) Field of Classification Search
  CPC ....... B60B 39/027; B60B 39/04; B60B 39/08; B60B 39/083; B60B 39/086; E01C 19/12; E01C 19/221; B61C 15/085; B61C 15/102; B61C 15/10; B61C 15/00
  USPC ................ 291/11.1, 11.12, 11.13, 12, 13, 19
  See application file for complete search history.

(56) References Cited

U.S. PATENT DOCUMENTS

| | | | | |
|---|---|---|---|---|
| 2,597,719 | A * | 5/1952 | Foster | ..................... E01H 8/105 15/340.1 |
| 4,230,045 | A * | 10/1980 | Fearon | ..................... E01H 8/105 291/1 |
| 4,936,610 | A | 6/1990 | Kumar et al. | |
| 5,301,996 | A * | 4/1994 | Theis | ..................... B60B 39/027 296/180.1 |
| 5,477,941 | A * | 12/1995 | Kumar | .................. B61C 15/107 184/6 |
| 6,588,808 | B1 * | 7/2003 | Sheppard | .............. B61C 15/102 291/1 |
| 2005/0140144 | A1 | 6/2005 | Kumar | |
| 2005/0253397 | A1 | 11/2005 | Kumar et al. | |
| 2012/0061367 | A1 * | 3/2012 | Wolff | ..................... B61C 15/08 219/202 |
| 2015/0051759 | A1 * | 2/2015 | Worden | .................. B61C 17/12 701/19 |
| 2017/0036681 | A1 * | 2/2017 | Winston | .................. B61C 15/08 |
| 2018/0119376 | A1 * | 5/2018 | Klima | ..................... E01H 8/105 |

FOREIGN PATENT DOCUMENTS

| | | | |
|---|---|---|---|
| EP | 3049303 A1 | 8/2016 | |
| WO | WO-2015044243 A2 * | 4/2015 | ............. B61C 15/10 |
| WO | WO 2015044243 A2 | 4/2015 | |
| WO | WO-2016118997 A1 * | 8/2016 | ............. B60B 19/06 |

* cited by examiner

TRACK-CONDITIONING UNIT WITH DEVICE FOR RAIL DRYING

BACKGROUND OF THE INVENTION

Field of the Invention:

The invention relates to a combined track conditioning unit. Furthermore, the invention relates to a rail vehicle. Moreover, the invention relates to a method for increasing a coefficient of friction between a rail and a wheel of a rail vehicle with the aid of a combined track conditioning unit.

The contact between the wheel of a rail vehicle and the rails that are traveled on, and thus also the adhesion coefficient, is greatly influenced by external conditions, for example moisture, dirt or the like. In order to increase an adhesion coefficient between a wheel of a rail vehicle and the rails that are traveled on, a track conditioning unit is used. Such a track conditioning unit is arranged in front of the wheel of a rail vehicle, over the rail. With the aid of the track conditioning unit, a gritting material, for example braking sand or aluminum oxide, is applied to rails in order to achieve better adhesion. A conventional track conditioning unit (see FIG. 1) has a sand spreading device, which consists of a sandbox, a sand system, a sand hose and a sand outlet tube. The sand outlet tube is used to apply sand in a targeted manner between the wheel and the rail. This sand is put onto the rail in a predetermined amount, for example 400 g per 30 seconds.

However, with spreading means alone, moisture on the railhead cannot be avoided. This is because, for example, spreading sand only partially binds water to the rail and so, by applying braking sand to wet rails, an increase in the coefficient of friction between the wheel and rail is possible only to a limited extent. In addition, as a result of the increased use of spreading material, there is greater wheel rim wear.

The document US 2018/0119376 A1 discloses a system in which compressed air is applied to a rail line.

The document US 2005/0140144 A1 discloses a system for applying sand to a rail line.

SUMMARY OF THE INVENTION

Therefore, the object is to specify an apparatus and a method with which an improved adhesion coefficient of a rail vehicle is achieved while having lower wheel rim wear.

This object is achieved by a combined track conditioning unit for a rail vehicle, the track conditioning unit having a combined dispensing apparatus with an outflow opening, integrated in the front region of the dispensing apparatus, for applying a gaseous drying medium to a rail, with a gritting material outlet unit, integrated in the rear region of the dispensing apparatus, for applying a gritting material to the rail, wherein this arrangement has the effect that a portion of track to be traveled over is first dried, then has a gritting material applied to it and is finally traveled over by a wheel of the rail vehicle with an increased adhesion value between the wheel and rail. This object is also achieved by a rail vehicle having a plurality of trucks, and a combined track conditioning unit which is arranged on a truck in front of a wheel of the truck and a method for increasing a coefficient of friction between a rail and a wheel of a rail vehicle with the aid of a combined track conditioning unit, having the steps of applying a gaseous drying medium to a rail through an outflow opening integrated in the front region of a dispensing apparatus of the combined track conditioning unit, and applying a gritting material to the rail through a gritting material outlet unit integrated in the rear region of the dispensing apparatus.

The combined track conditioning unit according to the invention has a combined dispensing apparatus with an outflow opening, integrated in the front region of the dispensing apparatus, for applying a gaseous drying medium to a rail, and a gritting material outlet unit, integrated in the rear region of the dispensing apparatus, for applying a gritting material to the rail. The outflow opening is connected to a drying unit that provides the gaseous drying medium and conveys it to the outflow nozzle. The gritting material outlet unit can be formed for example by a spreading material outlet tube. In this connection, the "front region" is intended to be located in front of the "rear region" in the direction of forward travel. As a result of this arrangement, a track portion to be traveled on is first dried, then has spreading material applied to it and is finally traveled on by the wheel in question. If a track conditioning unit according to the invention is additionally attached behind the wheel in question in the direction of forward travel for reverse travel, the defined arrangement applies in the direction of reverse travel.

As a result of the combination of the drying unit and gritting material outlet unit, in the event of moisture, a higher adhesion value between the wheel and rail is achieved than in the case of a solution that only has a gritting material device. As a result of the increased adhesion value achieved in this way, a rail vehicle that has the combined track conditioning unit can accelerate more quickly or alternatively accelerate higher loads and decelerate more quickly or decelerate higher loads.

Furthermore, less braking sand is consumed than without drying of the rails, because, as a result of the rail drying operation, a higher adhesion value is achieved. Therefore, the transmissible tractive force for rail vehicles is also increased, with the result that the performance of the rail vehicle is improved. Advantageously, no additional medium needs to be carried along, since rail vehicles already usually carry for example compressed air as gaseous drying medium on board. Therefore, the increase in weight on account of the additional functional unit also remains low.

The rail vehicle according to the invention has a plurality of trucks and a combined track conditioning unit according to the invention, which is arranged on a truck in front of a wheel of the truck. "Arranged in front of a wheel" is intended to mean in this context that the combined track conditioning unit is arranged in front of the wheel in the longitudinal direction, i.e. in the direction of forward travel, in order that the rail located in front of the wheel can be prepared with the applied auxiliary media. Preferably, the rail vehicle according to the invention has at least two combined track conditioning units according to the invention, in order to obtain the same adhesion coefficient for wheels running alongside one another on parallel rails. Such combined track conditioning units can also be arranged in front of each wheel in order to further improve the adhesion of the wheels. In addition, it is also possible for track conditioning units according to the invention to be arranged behind one or more wheels, in order to improve the adhesion coefficient when traveling in reverse, too.

The rail vehicle according to the invention shares the advantages of the combined track conditioning unit according to the invention. On account of the improved traction, it is optionally possible to dispense with locomotives or rail vehicles with multiple traction or even 6-axle locomotives.

In the method according to the invention for increasing a coefficient of friction between a rail and a wheel of a rail vehicle with the aid of a combined track conditioning unit, a gaseous drying medium is applied to a rail with the aid of an outflow opening integrated in the front region of a dispensing apparatus of the combined track conditioning unit. The outflow opening can be for example part of a nozzle and is configured to dispense gaseous media. With the aid of the gaseous medium, the rail is dried in the region in front of the wheel. Furthermore, a gritting material is applied to the rail through a gritting material outlet unit, for example a gritting material outlet tube, integrated in the rear region of the dispensing apparatus.

The method according to the invention for increasing a coefficient of friction between a rail and wheel of a rail vehicle with the aid of a combined track conditioning unit shares the advantages of the combined track conditioning unit according to the invention.

The dependent claims and the following description each contain particularly advantageous configurations and developments of the invention. Here, in particular the claims of one claim category can also be developed in an analogous manner to the dependent claims of a different claim category and the parts of the description relating thereto. In addition, within the scope of the invention, the various features of different exemplary embodiments and claims can also be combined to form new exemplary embodiments.

In a preferred configuration of the combined track conditioning unit according to the invention, the outflow opening and the gritting material outlet tube are integrated fixedly in the dispensing apparatus relative to one another and relative to the dispensing apparatus. Advantageously, a position or orientation of the outflow opening and gritting material outlet tube that has been preset during production cannot deviate from the position and orientation that has been determined to be suitable, and so regular correction or adjustment during operation is no longer necessary.

In a variant of the combined track conditioning unit according to the invention, the outflow opening and the gritting material outlet tube are arranged, in a test phase, so as to have a position and orientation that are adjustable and subsequently fixable for use, i.e. in regular operation. Advantageously, in a test phase, the most favorable position and orientation of the outflow opening and of the gritting material outlet tube can be determined and fixed, such that corrections and adjustment processes are subsequently no longer necessary in order that the auxiliary media correctly strike a rail that is traveled on.

In one configuration of the combined track conditioning unit according to the invention, the dispensing apparatus has laterally arranged outflow openings for drying the rail when traveling around a bend. "Laterally attached" is intended to mean in this connection that the outflow openings are not positioned exactly above the middle of a track when traveling straight ahead, but are arranged in a manner offset in a transverse direction thereto. Advantageously, the effective region of the track conditioning unit can be extended to subregions that need to be covered when traveling around bends. Therefore, improved traction and improved braking behavior are achieved even in bend regions. The laterally arranged outflow openings can, for example, be arranged in addition to outflow openings that are positioned exactly above the tracks when traveling straight ahead.

Preferably, the track conditioning unit is mounted fixedly on the truck. This has the advantage that there are no expensive and vulnerable adjustment mechanisms that may be damaged by increased g shocks on the truck. In the event of flying ballast or chunks of ice, which are present under the floor, as a result of the compact unit mounted fixedly on the truck, damage thereto or even failure thereof can be avoided and thus an improved winter performance can be achieved.

In a specific variant of the combined track conditioning unit according to the invention, the dispensing apparatus has at least one centrally arranged outflow opening for drying when traveling straight ahead. Centrally arranged outflow openings allow the rail to be dried when traveling straight ahead. The two abovementioned configurations can advantageously also be combined with one another in order to achieve improved adhesion in different kinds of routing.

In one configuration of the combined track conditioning unit according to the invention, the dispensing apparatus has a plurality of centrally arranged outflow openings, which are arranged on a rotary plate, for drying when traveling straight ahead. A rotary plate can be used for adjusting the outflow openings in a test phase, in order to orient the effective region of the outflow openings with respect to a rail.

In an alternative configuration of the combined track conditioning unit according to the invention, the at least one centrally arranged outflow opening has a slider with a plurality of outlets, which is displaceable in a transverse direction such that a position of a drying jet is displaceable in a transverse direction. This likewise makes it possible to adapt the effective region of an outflow opening with respect to a rail position.

Particularly preferably, the outflow opening for applying a gaseous drying medium is set up to apply compressed air as gaseous drying medium to the rail. Since compressed air is also conventionally carried along for the brake system, storage devices provided therefor can also be used as a source for the outflow opening or a drying unit comprising this outflow opening, such that the outlay for retrofitting and the additional weight and additional costs turn out to be low in the arrangement according to the invention.

In one configuration of the combined track conditioning unit according to the invention, the latter is embodied in a heated manner for transitional and winter operation, in order that the outflow openings and the gritting material outlet unit do not freeze. The heating can be effected for example with the aid of a heating rod, a heating coil or a heating foil.

Furthermore, for improved energy efficiency, insulation can be fitted around the outflow opening and the gritting material outlet unit, in that, in the event of cold weather, excess heat is not emitted into the environment.

The invention is explained again in more detail in the following text on the basis of exemplary embodiments with reference to the appended figures.

DETAILED DESCRIPTION OF THE INVENTION

Figure 1:
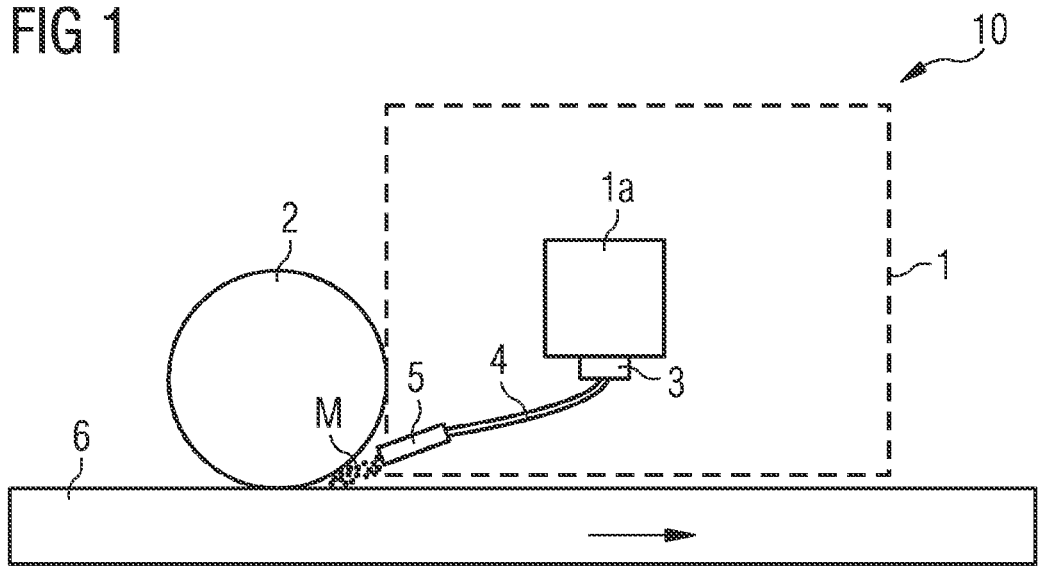
FIG. 1 shows a cross-sectional view of a conventional track conditioning unit, which is arranged in front of a wheel of a rail vehicle.

FIG. 1 illustrates a cross-sectional view 10 of a conventional track conditioning unit 1. The track conditioning unit 1 is arranged in front of a wheel 2 of a truck of a rail vehicle (not shown), as viewed in the direction of travel (symbolized by an arrow). The track conditioning unit comprises a sandbox 1a, which is used as a reservoir for the gritting material M employed. Located on the outer side of the bottom region of the sandbox 1a is a sand system 3, with which the flowrate of the gritting material is regulated. Attached to the sand system 3 is a sand hose 4, which delivers the gritting material M to a sand outlet tube 5. In front of the sand outlet tube 5, the gritting material is distributed over an effective region, i.e. on a surface of a rail head of a rail 6 on which the rail vehicle is traveling.

Figure 2:
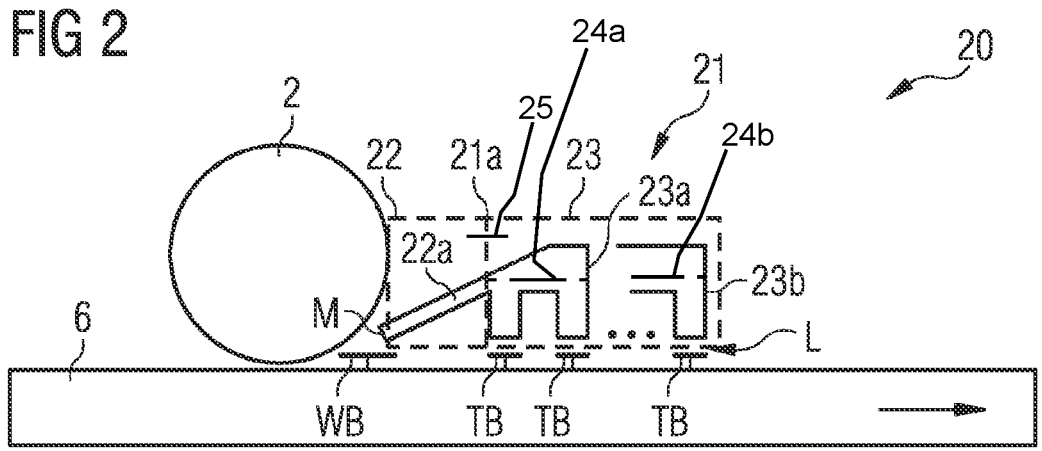
FIG. 2 shows a schematic cross-sectional view of a combined track conditioning unit according to one exemplary embodiment of the invention.

FIG. 2 illustrates a schematic cross-sectional view 20 of a combined track conditioning unit 21 according to one exemplary embodiment of the invention. The track conditioning unit 21 is arranged in front of a wheel 2 of a truck of a rail vehicle (not shown), as viewed in the direction of travel (symbolized by an arrow). The combined track conditioning unit 21 comprises, as part of a dispensing apparatus 21a, in its rear region, a fixedly installed gritting material device 22 with a gritting material outlet tube 22a. An apparatus 23 for drying the rail 6 on which the rail vehicle is traveling is also a part of the combined track conditioning unit 21. The apparatus 23 for drying the rail 6 has a plurality of outflow openings 23a, 23b, which are set up to emit an air flow L onto the rail 6. The outflow openings for drying the rail 6 are directed vertically downward in the direction of the rail 6 and are arranged in front of the gritting material outlet tube 22a of the gritting material device 22. The gritting material outlet tube 22a is directed diagonally downward onto the rail 6 such that the dispensed gritting material M is applied to the rail 6, directly in front of the wheel 2 of the rail vehicle, in an effective region WB. The air flow L of the outflow openings 23a, 23b is directed onto a region TB in front of the effective region WB of the gritting material device 22, such that the gritting material M drops onto a region of the rail 6 that has already been dried.

The at least one centrally arranged outflow opening has sliders 24a, 24b with a plurality of outlets, which are displaceable in a transverse direction such that a position of a drying jet is displaceable in a transverse direction.

The combined track conditioning unit is embodied in a heated manner for transitional and winter operation, in order that the outflow openings and the gritting material outlet unit do not freeze. The heating can be effected for example with the aid of a heating rod, a heating coil or a heating foil 25.

Figure 3:
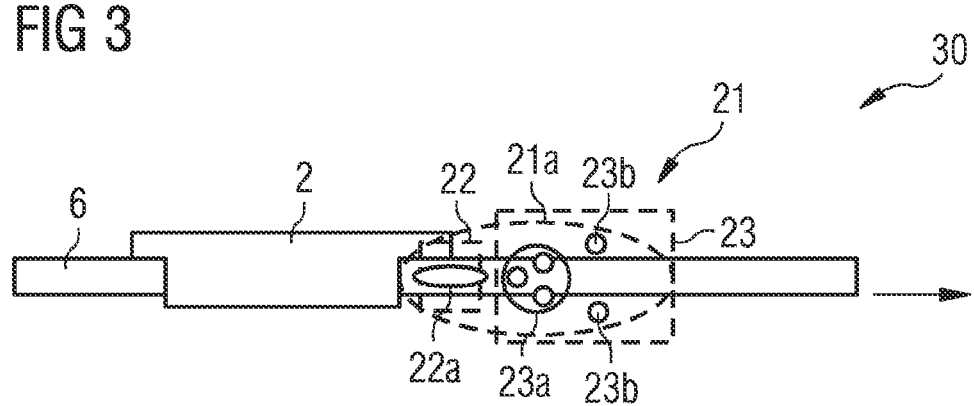
FIG. 3 shows a schematic plan view of a combined track conditioning unit according to one exemplary embodiment of the invention.

FIG. 3 shows a view 30 from below of the combined track conditioning unit 21 shown in FIG. 2. The track conditioning device 21 has a dispensing apparatus 21a. The dispensing apparatus 21a has, in its rear portion, i.e. in the portion facing the wheel 2 of the rail vehicle in question, a gritting material outlet tube 22a, which serves as a discharging point for a gritting material, in this case sand. Formed in a central portion of the dispensing apparatus 21a is a region with three drying outflow openings 23a. The centered arrangement of the drying outflow openings 23a allows an air jet to be directed onto the rail 6 that is being traveled on when traveling straight ahead. In this case, either exactly one outflow opening 23a is positioned above the middle of the rail or two outflow openings are arranged in a manner offset slightly to the right and the left above the middle of the rail. Furthermore, the dispensing apparatus 21a also comprises two outflow openings 23b in the front region, which are positioned in order to dry the rail 6 when traveling around a left-hand bend or a right-hand bend. These two outflow openings 23b are each arranged in a laterally offset manner, to be more precise in a manner offset to the right and to the left relative to the middle. The three outflow openings can be actuated simultaneously or separately, depending on the operating condition. In the case of separate actuation, the required amount of drying medium is reduced.

Figure 4:
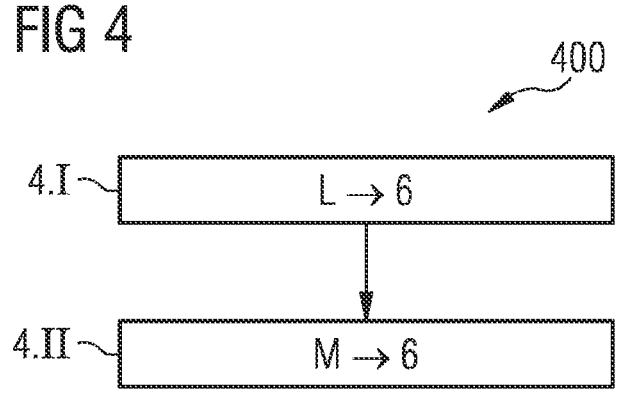
FIG. 4 shows a flowchart, which illustrates a method for increasing a coefficient of friction between a rail and a wheel of a rail vehicle with the aid of a track conditioning unit according to one exemplary embodiment of the invention.

FIG. 4 shows a flowchart 400, which illustrates a method for increasing a coefficient of friction between the rail and wheel of a rail vehicle with the aid of a track conditioning unit. In step 4.1, a gaseous drying medium L is applied to a rail 6 by an outflow opening integrated in the front region of a dispensing apparatus of the track conditioning unit. Furthermore, in step 4.2, a gritting material M is applied to the rail 6 through a gritting material outlet tube integrated in the rear region of the dispensing apparatus.

Finally, it is noted once again that the above-described method and apparatuses are merely preferred exemplary embodiments of the invention and that the invention can be varied by a person skilled in the art without departing from the scope of the invention, to the extent that it is specified by the claims. For the sake of completeness, it is also noted that the use of the indefinite article "a" or "an" does not preclude the features in question also being present in a plurality. Likewise, the term "unit" does not preclude the latter from consisting of a plurality of components that may also be distributed spatially, if appropriate.

The invention claimed is:

1. A combined track conditioning unit for a rail vehicle, the combined track conditioning unit comprising:
    a combined dispensing apparatus having a front region, a rear region, at least one outlet opening disposed centrally relative to a transverse direction of the rail vehicle and two outlet openings disposed laterally relative to the transverse direction of the rail vehicle, said two laterally-disposed outlet openings disposed upstream of said at least one centrally-disposed outlet opening in a travel direction of the rail vehicle and all of said outlet openings having a location in said front region for applying a gaseous drying medium to a rail, and a gritting material outlet unit having a location in said rear region for applying a gritting material to the rail;
    said at least one centrally disposed outflow opening being configured for drying when traveling straight ahead, and said at least one centrally-disposed outlet opening including a plurality of centrally disposed outflow openings disposed on a rotary plate for drying when traveling straight ahead;
    said two laterally-disposed outlet openings and said at least one centrally-disposed outlet opening being simultaneously and separately operable in dependence on conditions of the rail;
    said locations of said outflow opening and said gritting material outlet unit causing a portion of a track being traveled over to be initially dried, to then have the gritting material applied to it and to finally be traveled over by a wheel of the rail vehicle with an increased adhesion value between the wheel and the rail.

2. The combined track conditioning unit according to claim 1, wherein said outflow opening and said gritting material outlet unit are integrated fixedly in said combined dispensing apparatus.

3. The combined track conditioning unit according to claim 1, wherein said outflow opening and said gritting material outlet unit have an adjustable and fixable position and orientation in a test phase.

4. The combined track conditioning unit according to claim 1, wherein said two laterally disposed outflow openings are configured for drying the rail when traveling around a bend.

5. The combined track conditioning unit according to claim 1, wherein said at least one centrally disposed outflow opening has a slider with a plurality of outlets, said slider being displaceable in a transverse direction permitting a position of a drying jet to be displaceable in a transverse direction.

6. The combined track conditioning unit according to claim 1, wherein said outflow openings for applying a gaseous drying medium are configured to apply compressed air as the gaseous drying medium to the rail.

7. The combined track conditioning unit according to claim 1, wherein said combined dispensing apparatus is configured to be heated.

8. The combined track conditioning unit according to claim 1, wherein said outlet openings dispense a reduced amount of drying medium upon operating said two laterally-disposed outlet openings separately from said at least one centrally-disposed outlet opening.

9. A rail vehicle, comprising:
   a plurality of trucks; and
   a combined track conditioning unit according to claim 1 disposed on one of said trucks in front of a wheel of said one truck.

10. A combined track conditioning unit for a rail vehicle, the combined track conditioning unit comprising:
    a combined dispensing apparatus having a front region, a rear region, an outflow opening having a location in said front region for applying a gaseous drying medium to a rail, and a gritting material outlet unit having a location in said rear region for applying a gritting material to the rail;
    said locations of said outflow opening and said gritting material outlet unit causing a portion of a track being traveled over to be initially dried, to then have the gritting material applied to it and to finally be traveled over by a wheel of the rail vehicle with an increased adhesion value between the wheel and the rail; and
    said combined dispensing apparatus having a plurality of centrally disposed outflow openings disposed on a rotary plate for drying when traveling straight ahead.

\* \* \* \* \*